United States Patent [19]

Echerd et al.

[11] 3,769,072

[45] Oct. 30, 1973

[54] PIPE LAGGING MATERIAL AND PROCESS FOR MAKING SAME

[75] Inventors: James W. Echerd, Charlotte, N.C.; Warren K. Watters, New Orleans, La.

[73] Assignee: H. K. Porter Company, Inc., Trenton, N.J.

[22] Filed: Mar. 24, 1967

[21] Appl. No.: 625,604

[52] U.S. Cl. ................... 117/126 AF, 117/169 R
[51] Int. Cl. ............................................. C03c 25/00
[58] Field of Search .................. 117/126 I, 126 GI, 117/123 A, 143 I, 169, 70 D; 106/84, 110; 138/177, 149, 144

[56] References Cited
UNITED STATES PATENTS

| | | | |
|---|---|---|---|
| 465,717 | 12/1891 | Miller | 106/110 |
| 527,867 | 10/1894 | Manville | 106/110 |
| 1,387,348 | 8/1921 | Burgstresser | 138/149 X |
| 1,577,450 | 3/1926 | Crowell | 106/84 |
| 2,047,778 | 7/1936 | Hayden | 138/149 X |
| 2,400,884 | 5/1946 | Lloyd | 106/110 |
| 2,554,963 | 5/1951 | Stafford | 117/126 |
| 2,884,343 | 4/1959 | McCluer | 117/126 |
| 2,948,641 | 8/1960 | McCluer | 117/138 X |
| 3,009,829 | 11/1961 | Gouveia | 117/126 |
| 3,025,176 | 3/1962 | Herrington | 106/110 X |

*Primary Examiner*—William D. Martin
*Assistant Examiner*—Theodore G. Davis
*Attorney*—Parrott, Bell, Seltzer, Park and Gibson

[57] ABSTRACT

A pipe lagging material composed of a base having impregnated therein a composition consisting essentially of inorganic hydrophilic siliceous material, which can be wet with water and wrapped about a pipe conduit to form, upon subsequent drying, a rigid, non-friable, flame-resistant covering thereon.

9 Claims, No Drawings

PIPE LAGGING MATERIAL AND PROCESS FOR MAKING SAME

This invention relates to a pipe lagging material such as for use in securing insulation on a pipe conduit. Such materials generally consist of a base, such as fabric, which is wrapped, or "lagged," about the outside of insulation on a pipe to hold the insulation in place and thereby protect the contents of the pipe against thermal gain or loss. It is highly desirable that such pipe lagging materials be flame-resistant, safe to handle, and easily permanently bonded to pipe insulation at a work site to form a non-friable, protective coating about the insulation. It is also essential that the lagging material possess sufficient adhesive qualities to be retained on the pipe under various conditions of use.

Prior pipe lagging materials have been composed of relatively narrow lengths of plain fabric which, in order to be firmly adhered to the surface of the insulation upon wrapping, are treated with a liquid adhesive composition and then wrapped about the insulation while still in wet condition. The adhesives used must provide both good wet adhesion of the fabric to the pipe, when initially placed thereon, and subsequent good dry adhesion of the fabric to the surface of the insulation for an indefinite period thereafter. To insure good dry adhesion of the wrapped fabric, and to prevent it from becoming detached from the insulation after the first adhesive solution has dried, the faric must be overcoated with an additional adhesive, such as an organic paint, before the first adhesive has fully dried.

The adhesive components necessary to retain the lagging fabric on the insulation are generally quite toxic in nature and tend to cause dermatitis and otherwise irritate the skin of workmen handling the wet materials during the lagging operation. Another disadvantage of the prior lagging materials is that, since the fabric containing the wet adhesive composition is quite tacky, the lagging material is easily soiled during handling by the workmen in applying it to the pipe. In addition, because the overcoating adhesive of the lagging material is composed primarily of organic components which are combustible at elevated temperatures, the environs in which the lagging material may be safely used are limited.

In accordance with the present invention, we have overcome, to a great extent, the aforementioned disadvantages of pipe lagging materials by providing a rewettable, non-toxic, drapable lagging material which is adapted to be wet with water at the work site and adhesively applied to a pipe surface to form, upon drying, a substantially rigid, non-friable, flame-resistant covering thereon. The lagging material can be prepared and stored indefinitely in a dry condition prior to use, and can be used to cover insulation or wrapped directly on the pipe itself as an insulator, as desired.

We accomplish the foregoing by impregnating a suitable base such as a porous fabric with a liquid slurry of a hydrophilic inorganic composition which dries to form, with the base, a drapable, non-dusting lagging material. The composition can thereafter be hydrated with water to form a substantially rigid, non-friable mass of interlaced, needle-like crystals firmly bonding the lagging material to a desired surface. The lagging material possesses both excellent wet and dry adhesion, even to relatively smooth surfaces, so that subsequent coating with an adhesive is not required to permanently secure the material on the pipe.

In preparing the liquid slurry for impregnation of the base, it is necessary that the viscosity of the slurry, i.e., the degree of hydration of the hydrophilic components, be controlled so that the slurry readily penetrates the base and is bonded thereto after drying without greatly decreasing the drapability of the same. In this respect, dispersion of the composition in a liquid containing approximately equal amounts of water and a water-soluble compound, such as a low molecular weight alcohol, ester, or ketone, will effectively limit the viscosity of the slurry to produce a flexible, drapable material upon drying.

The porous base used in forming the lagging material may be of various fiber types, e.g., cellulosic, synthetic, proteinaceous, mineral, glass, asbestos, ceramic, siliceous, or any combination of the foregoing reinforced with wire, and it should possess sufficient porosity to permit impregnation with the adhesive composition. Where a high degree of flame resistance is desirable, loosely woven asbestos-base fabrics, i.e., fabrics containing at least 50 percent by weight asbestos fibers, have been found to be quite satisfactory.

For the impregnant composition of the base we have found that dusting or flaking of the dry impregnant from the base can be prevented and wet adhesion is enhanced by the use of hydrophilic siliceous materials, such as clays, e.g., bentonite and kaolin, and hydrous magnesium silicate. In addition to these siliceous materials, the inorganic composition may contain other inorganic compounds, such as Plaster of Paris, which are capable of forming a crystalline network when hydrated with water.

To provide greater flame resistance, a flame-retardant compound may be added to the lagging material and it can be conveniently incorporated in the slurry prior to impregnation of the base. In this respect, we have found that sodium fluoborate serves to give excellent flame-retardancy and when this compound is used in conjunction with the aforementioned hydrophilic siliceous materials, it also serves to retard the thickness of the slurry during application, thereby eliminating the necessity for using water-soluble organic compounds for such purpose.

To apply the lagging material to a pipe conduit or other suitable surface, the material is wet with water at the work site and then wrapped about the pipe, or it can be wet at some remote location and placed in a moisture-vapor-proof barrier for storage and transportation to the work site. While wet, the lagging material will readily adhere to the surface upon which it is placed and, upon subsequent drying, the material forms a rigid covering bonded to such surface. The lagging material will usually be sufficiently wet after about 30 seconds contact with water; however, it may be left in the water for extended periods without significant leaching out or losing its adhesive character.

The amount of the inorganic composition in the base may be varied, depending on the particular results desired. Lagging materials having excellent wet and dry adhesion have been prepared using approximately 50 percent by dry weight of the composition with medium-weight fabric bases and 80 percent by dry weight of the composition for light-weight fabric bases.

From the foregoing, it will be appreciated that since the inorganic composition remains impregnated in the base in a non-tacky condition until use, the lagging material can be kept much cleaner during handling. Further, because the material is composed of non-toxic constituents, it can be handled without danger of injury to workmen. Finally, the rewettable nature of the lagging material, coupled with its inorganic constitutions, permits effective application and use of the lagging material in locations not heretofore practicable, such as aboard marine vessels at sea and in areas requiring the use of non-flammable materials.

While we have described our product generally in regard to its application as pipe lagging, we do not wish to imply that its uses are so restricted since many other applications will present themselves. Additionally, although we gerally refer to the base as being a woven fabric, the base could also be in the form of a knitted or non-woven fabric, a lap or fibrous batt, a yarn or cord, a braided product, a rope or wick, or any textile product made from any of the aforementioned fibers.

If applications are made using one or more of these other textile forms as the base, e.g., a lap or fibrous batt, the impregnated material may be wrapped or laterally applied to any surface for purposes of thermal insulation, binding protection shield, etc.

Additionally, if a particular surface characteristic is desired, the lagging material can be provided on one face thereof with a suitable flexible coating or film such as aluminum, rubber, or any desired resinous material suitable for the intended end use of the product. When coated in this manner, the product can still be applied to a desired surface by wetting the whole fabric and while wet applying the uncoated surface to the surface upon which it is desired to mount the material, leaving the coated side exposed outermost.

The following specific examples are given to illustrate a manner in which the invention may be practiced, and are in no way intended to limit the scope of the invention.

EXAMPLE I

A plain weave asbestos-base fabric (approximately 80 percent by weight asbestos) of approximately 0.75 lbs./yd.$^2$ is impregnated by dipping it into a liquid slurry containing the following components.

| | Parts By Weight |
|---|---|
| Water | 25 |
| Isopropyl Alcohol | 30 |
| Bentonite (Clay) | 20 |
| Plaster of Paris | 20 |
| X-12 Flame Retardant (a proprietary composition based upon ammonium salts sold by E. I. DuPont de Nemours & Co., Inc.) | 5 |

After impregnation the dry weight of the fabric is approximately 1.5 lbs./yd$^2$

EXAMPLE II

A lagging material is prepared as above, utilizing the following slurry composition.

| | Parts By Weight |
|---|---|
| Water | 37 |
| Isopropyl Alcohol | 38 |
| Bentonite (Clay) | 24 |
| NaBF$_4$ (Flame Retardant) | 1 |

EXAMPLE III

A lagging material is prepared as in Example I, utilizing the following slurry composition.

| | Parts By Weight |
|---|---|
| Water | 36 |
| Isopropyl Alcohol | 38 |
| Magnesium Silicate | 25 |
| Antimony Silico Oxide (Flame Retardant) | 1 |

Upon drying, one face of the material formed in accordance with Example III is then coated with a water dispersion of latex form of neoprene of sufficient thickness to form a continuous film on the coated face of the fabric.

The lagging materials prepared as in Examples I, II and III, upon wetting and application to a pipe conduit, exhibit excellent wet adhesion to the pipe and, upon subsequent drying, form substantially rigid, non-friable protective coverings adhesively bonded thereto.

In the specification there has been set forth a preferred embodiment of the invention and, although specific terms are employed, they are used in a generic and descriptive sense only and not for purposes of limitation, the scope of the invention being defined in the claims.

That which is claimed is:

1. A flame-resistant, drapable, pipe lagging material characterized by having sufficient flexibility and wet strength to permit the same to be wrapped when wet around insulated pipe surfaces and the like, and having sufficient adhesive characteristics to firmly bond itself to such surfaces upon subsequent drying, said pipe lagging material comprising a porous, woven, textile fabric base, having substantial flexibility in both wet and dry state, and a latent adhesive composition consisting essentially of an inorganic hydrophilic siliceous material impregnated in and firmly bonded to said fabric base and substantially inseparable therefrom through leaching-out in water and through flexure in dry condition, and having adhesive characteristics, when wet, to adhere the pipe lagging material to a surface around which it is wound and, when subsequently dried, to firmly bond and form with said fabric base an adherent, non-dusting covering on such surface.

2. A pipe lagging material as defined in claim 1 wherein said latent adhesive composition constitutes at least approximately 50 percent of the dry weight of such pipe lagging material and wherein said siliceous material comprises one or more materials selected from the group consisting of kaolin, bentonite, and hydrous magnesium silicate.

3. A flame-resistant, drapable, pipe lagging material characterized by having sufficient flexibility and wet strength to permit the same to be wrapped when wet around insulated pipe surfaces and the like, and having sufficient adhesive characteristics to firmly bond itself to such surfaces upon subsequent drying, said pipe lagging material comprising a porous fabric base, having substantial flexibility and strength in both wet and dry state, and a latent adhesive composition consisting essentially of an inorganic hydrophilic siliceous material impregnated in and firmly bonded to said fabric base and substantially inseparable therefrom through leaching-out in water and through flexure in dry condition, and having adhesive characteristics, when wet, to adhere the pipe lagging material to a surface around which it is wound and, when subsequently dried, to firmly to bond and form with said fabric base an adherent, non-dusting covering on such surface, said latent adhesive composition constituting at least approximately 50 percent of the dry weight of such pipe lagging material.

4. A pipe lagging material as defined in claim 3 wherein said latent adhesive composition constitutes approximately 80 percent of the dry weight of such pipe lagging material.

5. A flame-resistant, drapable, pipe lagging material characterized by having sufficient flexibility and wet strength to permit the same to be wrapped when wet around insulated pipe surfaces and the like, and having sufficient adhesive characteristics to firmly bond itself to such surfaces upon subsequent drying, said pipe lagging material comprising a porous asbestos-base, woven, textile fabric base, having substantial flexibility in both wet and dry state, and a latent adhesive composition consisting essentially of an inorganic hydrophilic siliceous material impregnated in and firmly bonded to said fabric base and substantially inseparable therefrom through leaching-out in water and through flexure in dry condition, and having adhesive characteristics, when wet, to adhere the pipe lagging material to a surface around which it is wound and, when subsequently dried, to firmly bond and form with said fabric base an adherent, non-dusting covering on such surface.

6. A pipe lagging material as defined in claim 5 in which said asbestos-base, woven, textile fabric base consists of at least 50 percent by weight asbestos fibers.

7. A pipe lagging material as defined in claim 5 wherein said latent adhesive composition includes sodium fluoborate and which composition constitutes at least approximately 50 percent of the dry weight of such pipe lagging material.

8. A pipe lagging material as defined in claim 5 wherein said latent adhesive composition constitutes at least approximately 50 percent of the dry weight of such pipe lagging material, and wherein said siliceous material comprises one or more materials selected from the group consisting of kaolin, bentonite, and hydrous magnesium silicate.

9. A pipe lagging material as defined in claim 8 wherein said latent adhesive composition includes Plaster of Paris.

* * * * *